Dec. 12, 1933.   C. LE G. FORTESCUE ET AL   1,939,046
PROTECTIVE RELAY
Filed June 16, 1930   3 Sheets-Sheet 1
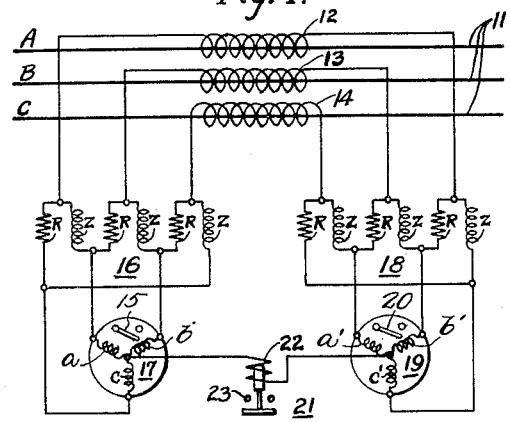
Fig. 1.
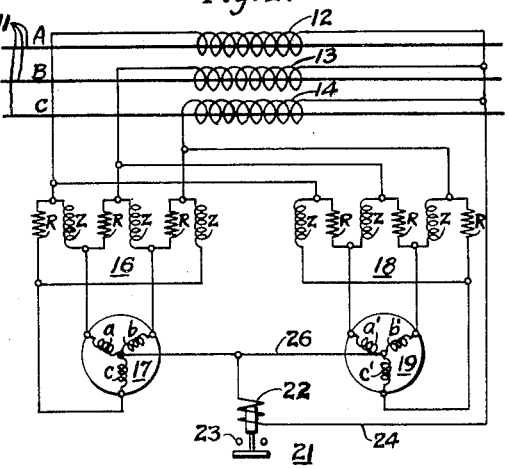
Fig. 2.
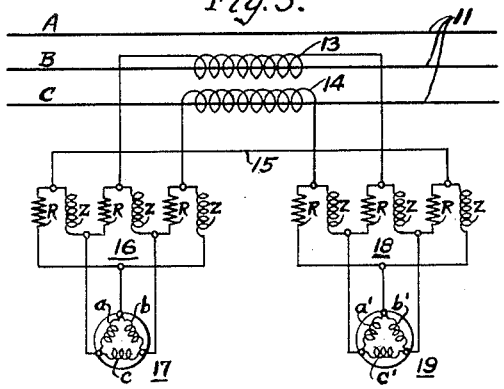
Fig. 3.
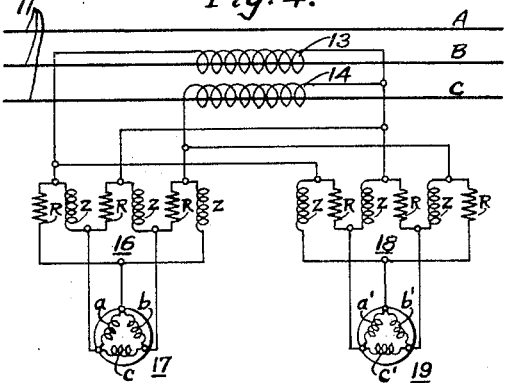
Fig. 4.
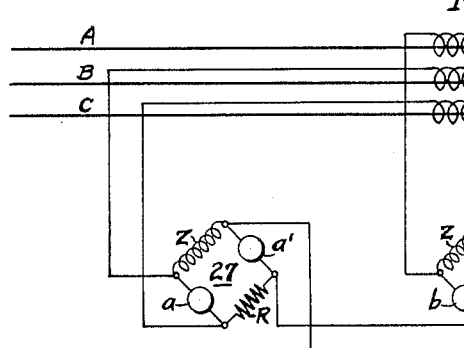
Fig. 5.
Fig. 5a
INVENTORS
Charles LeG. Fortescue, and
Robert D. Evans.
BY
Wesley G. Carr
ATTORNEY Dec. 12, 1933.  C. LE G. FORTESCUE ET AL  1,939,046
PROTECTIVE RELAY
Filed June 16, 1930   3 Sheets-Sheet 2

INVENTORS
Charles Le G. Fortescue, and
Robert D. Evans.
BY
Wesley F. Carr
ATTORNEY

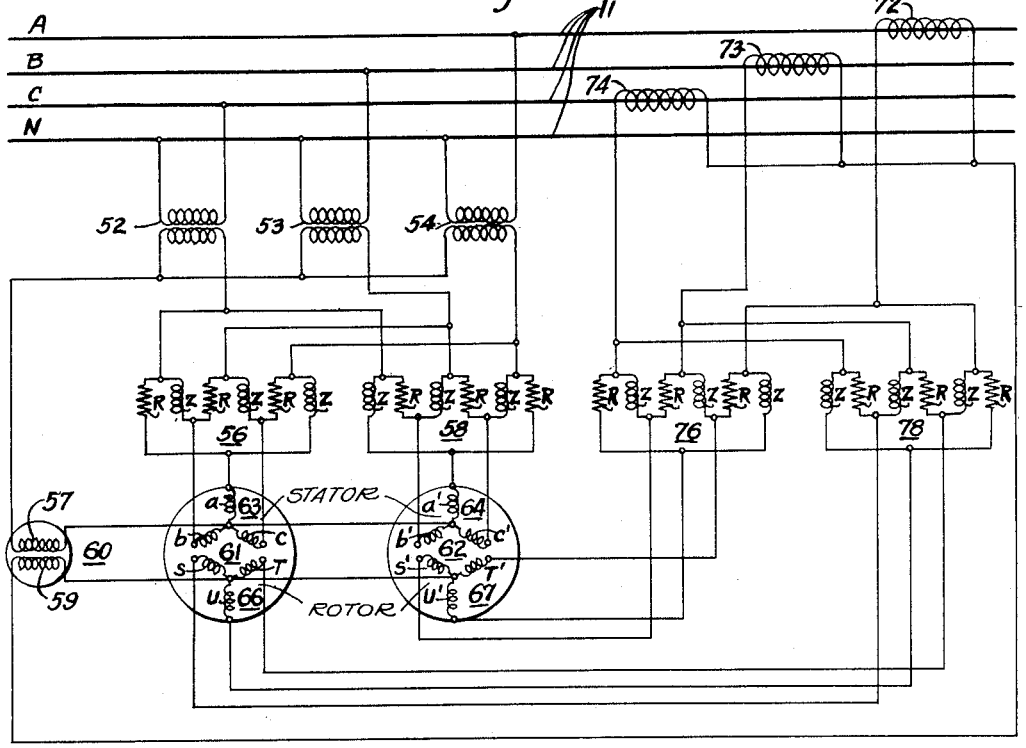
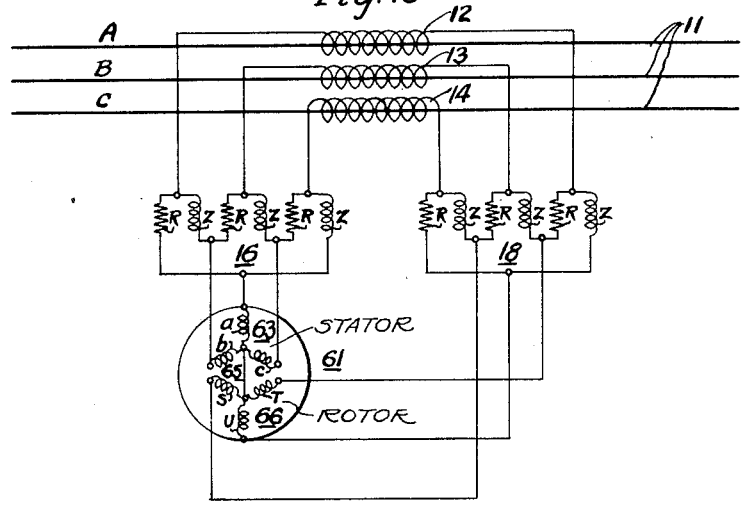
INVENTORS
Charles LeG. Fortescue, and
Robert D. Evans.
BY
ATTORNEY Patented Dec. 12, 1933

1,939,046

UNITED STATES PATENT OFFICE 1,939,046

PROTECTIVE RELAY

Charles Le G. Fortescue, Pittsburgh, and Robert D. Evans, Swissvale, Pa., assignors to Westinghouse Electric and Manufacturing Company, a corporation of Pennsylvania Application June 16, 1930. Serial No. 461,334

7 Claims. (Cl. 175—294)

This invention relates to protective relays for polyphase transmission systems.

The most convenient method for analyzing transient unbalanced conditions on power systems is the method of symmetrical components. This method depends fundamentally on the principle that any three vectors may be resolved into three sets of components, two of which are balanced three-phase vectors and the third consisting of three equal in-phase vectors. Such components are the positive phase-sequence, negative phase-sequence and zero-phase sequence, respectively, and their occurrence in any particular transmission system depends upon the conditions existing on that system.

The majority of relays utilized in protective systems, at present, are single-phase relays, but the application of single-phase relays to polyphase systems is fundamentally incorrect inasmuch as polyphase currents and voltages are available. In order to actuate single-phase relays, it is necessary to transform or convert single-phase values into polyphase values because single-phase relays depend for their torque upon some type of phase-splitting means, since it is necessary for the relay to transform the single-phase into polyphase, and this transformation requires an appreciable amount of kva., which is objectionable from the customer's standpoint.

A polyphase relay, besides obviating the above objectionable feature, has the added advantage of reducing the volt-ampere load on current transformers and also, since it is of the electrodynamic type instead of the usual induction type employed in the single-phase relay, it also operates more quickly and more reliably.

Heretofore, it has been impossible to use polyphase relays for the protection of polyphase systems because of the widely differing degree of energization to which such a relay must be subjected for operating during various faults occurring on the system. Three single-phase elements have been combined so that their respective torques are exerted upon the same actuating or contact member, and the combination commonly referred to as a polyphase meter or relay; however, these elements are substantially the same as employed in the usual single-phase relay. In ordinary polyphase relays, or in the combination of three single-phase relays associated with a common shaft, there is no method or means of controlling their relative response to the different fault conditions and still keep the response of such relays independent of the location of the fault. By using phase-sequence polyphase relays, the necessary means of control is provided.

With the application of phase-sequence networks associated with polyphase relays, it is possible to provide full protection for a polyphase system inasmuch as the phase-sequence components are indicative of all possible faults occurring on the system. The use of such phase-sequence components also provides full protection for any polyphase system, irrespective of the degree of its unbalance.

It is an object of this invention, therefore, to provide a polyphase relay means for the protection of polyphase transmission systems.

Another object of this invention is to provide protection for a polyphase system by means of polyphase relays energized in accordance with the phase-sequence components occurring in the system.

Another object of this invention is to provide a type of relay having minimum volt-ampere burden on instrument transformers.

Another object of this invention is to provide a more quickly responsive relay means than the ordinary induction type, single-phase relay.

Another object of this invention is to provide polyphase relays responsive to the phase-sequence components occurring in a polyphase system and to thereby afford full protection for all fault conditions occurring on the systems.

A further object of this invention is to obtain uniform response of each relay irrespective of the phase disposition of unbalanced loads or faults. By this means, directional polyphase relays can be used while single-phase relays would give incorrect operation under many conditions.

A further object of this invention is to energize polyphase instruments in accordance with the phase-sequence components in a polyphase system.

Further objects and advantages of this invention will become apparent from the following description of the various modifications shown in the drawings.

In the various figures of the drawings:

Figure 1 is a schematic diagram representing two polyphase phase-sequence relays and a single-phase relay in series circuit relation with current transformers associated with a polyphase system.

Fig. 2 is substantially the same as Fig. 1, except that the polyphase relays are in parallel circuit relation with the single-phase relay and the current transformers.

Fig. 3 is a two-current transformer scheme utilizing only two polyphase relays.

Fig. 4 is a modification of the scheme shown in Fig. 3.

Fig. 5 is a schematic diagram of a bridge type embodiment of phase-sequence responsive polyphase relays.

Fig. 5a is a schematic representation of the winding connections of the relays shown in Fig. 5.

Fig. 12 illustrates an embodiment of this invention utilizing polyphase relays energized in accordance with both the voltage and current of an alternating-current system.

Fig. 13 illustrates a single polyphase relay having a stator and a rotor winding energized by the phase-sequence components of current.

Figure 6:
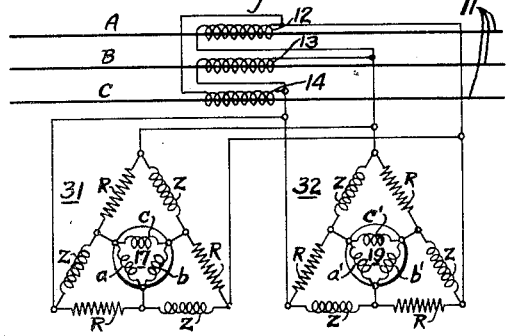
Fig. 6 is a modified form of network arrangement associated with two polyphase relays.

A brief review of the nature and occurrence of the symmetrical or phase-sequence components of current and voltage in a polyphase system will aid in determining the operation of the various schemes herein presented. For the purpose of description, a star-connected three-phase system will be considered.

For a balanced three-phase system under no load or under normal balanced load conditions, only the positive phase-sequence components are in existance. For such a symmetrical condition, the currents in the three phases are of equal magnitude and spaced 120 electrical degrees apart, and there is no ground current. The negative and zero phase-sequence components are all zero and the positive phase-sequence components comprise the total system voltages and currents. For a three-phase short-circuit, the currents in the three phases bear the same relation to each other as pointed out above with reference to the currents of a balanced three-phase system. The positive phase-sequence components, therefore, comprise the total short-circuit currents because of the symmetry of a three-phase short-circuit; and, at any instant, the positive phase-sequence current flowing in any conductor is returning along the other two conductors.

The negative phase-sequence components are balanced three-phase currents and differ from the positive phase-sequence components in that the phase sequence is reversed and also because the negative phase-sequence reactance may be different from the positive phase-sequence reactance; the respective phase-sequence impedances being equal.

In the event of a line-to-line short-circuit, there being no ground connection, only the positive and negative phase-sequence components exist, the magnitude of each phase-sequence voltage component depending on the respective phase-sequence impedances of the two components, and the magnitude of the positive and negative sequence components of fault currents being equal.

For a line-to-ground short-circuit in the systems with grounded neutral, the positive, negative and zero phase-sequence components of current flow. The zero phase-sequence components of current comprise three equal currents in the system, the positive and negative phase-sequence components neutralizing the zero phase-sequence components in the two ungrounded phases at the fault. The magnitude of the positive, negative and zero phase-sequence components assume a definite ratio to each other in accordance with their respective phase-sequence reactances. As indicated above, the negative phase-sequence reactance may be taken as about equal to the positive phase-sequence reactance. The zero phase-sequence reactance may vary greatly in value. In a particular case the magnitudes of the different phase-sequence components occurring in the event of a fault may be calculated with a reasonable degree of accuracy.

From the foregoing, it may be seen that negative phase-sequence components of voltage and current appear in an electrical system in every case of an unbalancing disturbance, whereas the zero phase-sequence components appear only in the case of a fault to ground in a grounded neutral system. It follows, therefore, that a relay responsive to zero phase-sequence components is not necessary for the protection of a polyphase system, while its use may provide for instantaneous operation in the event of some ground conditions occurring on a grounded-neutral system. However, it is obvious that both a positive and a negative phase-sequence relay are necessary for the full protection of a polyphase system.

Referring more particularly to Fig. 1 of the drawings, current transformers 12, 13 and 14 are associated with the respective phases A, B and C of a three-phase system 11. One terminal of the secondary winding of each transformer is parallel-connected with a resistance R and an inductance Z. The resistances R and inductances Z are series-connected to form a network 16 for the purpose of segregating the negative phase-sequence components of current from the system 11. Across each series-connected pair of impedances, R and Z, are connected the terminals of the respective phases, a, b, and c of a star-connected polyphase relay 17.

The other terminals of the secondary windings of the current transformers 12, 13 and 14 are similarly connected to a network 18, comprised of a plurality of resistances R and inductances Z, connected in series, and the phases a', b' and c' of a star-connected polyphase relay 19 are connected to this positive phase-sequence segregating network 18.

A relay 21 has one terminal of its energizing winding 22 connected to the star-connection or neutral of the polyphase relay 17, and the other terminal is connected to the star-connection of the polyphase relay 19. This relay is, therefore, made responsive to the zero phase-sequence components of current flowing in the three-phase system 11. The relay is adapted to close its contacts 23 and thereby complete any desired control circuit.

The contacts for the polyphase relays 17 and 19 indicated generally by 15 and 20, respectively, are to be understood as being adapted to complete any desired control circuit in response to the occurrence of negative and positive phase-sequence components of current, respectively.

The relative values of the resistances R and the inductances Z of the network 16, are so proportioned that the negative phase-sequence components of current are segregated from the system 11 and supplied to the phases of the polyphase relay 17. Similarly, the values of the resistances R and inductances Z of the network 18 are so proportioned and connected to the current transformers, that the polyphase relay 19 is made to respond to the positive phase-sequence components of current in the system 11.

In the event of a three-phase fault or for sustained load conditions, only the polyphase relay 19 will be energized to control protective means for the faulty circuit 11 (not shown). On the occurrence of a line-to-line fault such as a short-circuit on phases A and B, the polyphase relays 17 and 19 will be energized to control suitable protective means (not shown). In the event one of the phases such as phase A becomes grounded, both the polyphase phase-sequence relays 17 and 19 and the zero phase-sequence relay 21 will be energized. Relays 17, 19 and 21 will also be energized for a double fault-to-ground such as a short-circuit between phases A and B and ground.

In Fig. 2, current transformers 12, 13 and 14 are electrically associated with the respective phases A, B and C of a three-phase system 11. One terminal of each of the secondary windings of the current transformers is parallelly-connected to one of the pairs of impedances R and Z in the respective impedance networks 16 and 18. The networks are similar to those shown and described in Fig. 1 and the phases $a$, $b$, $c$ and $a'$, $b'$, $c'$ of the respective star-connected polyphase relays 17 and 19 are connected to the respective networks 16 and 18 as indicated with reference to Fig. 1.

The other terminals of the secondary windings of the current transformers are connected together and the common terminal connected by means of conductor 24 to the energizing winding 22 of a relay 21, the other terminal of the energizing winding 22 being connected to both of the star-connections of the polyphase relays 17 and 19 by means of conductor 26. The relay 21 is provided with contacts 23 which are adapted to be closed upon the energization of the winding 22 by the zero phase-sequence components of current occurring in the system 11.

The polyphase relays 17 and 19 are provided with suitable contacts (not shown) and are responsive to the negative and positive phase-sequence components of current respectively. The energization of the relays 17, 19 and 21 on the occurrence of any fault conditions on the system 11 is the same as the corresponding relays shown and described with reference to Fig. 1.

Fig. 3 is a two current transformer scheme wherein current transformers 13 and 14 are associated with phases B and C, respectively, of a three phase system 11. One terminal of the secondary winding of each of the current transformers 13 and 14 is connected in parallel relation with a resistance R and an inductance Z. An added resistance R and inductance Z are connected in series with the other resistances R and inductances Z to form an impedance network 16. This network is similar to the networks shown in Figs. 1 and 2, and a polyphase relay 17 is connected thereto in a manner similar to the connections of the polyphase relays shown and described in the above-mentioned figures. The relay 17, however, is shown as having delta-connected windings $a$, $b$ and $c$.

The other terminals of the secondary windings of the current transformers 13 and 14, are connected to a similar impedance network 18 in a similar manner to the connections of the network 16. A conductor 15 connects the added impedances R and Z of the networks 16 and 18 in series, and a delta-connected polyphase relay 19 having its three phases $a'$, $b'$ and $c'$ connected to the network 18 and is adapted to actuate contacts for any suitable control circuit (not shown).

The network 16 segregates the negative phase-sequence components of current occurring in the system 11 due to fault conditions, and the polyphase relay 17 is energized thereby for all faults except three-phase short-circuits. The network 18 segregates the positive phase-sequence components of current from the system 11 and is energized for any system conditions. It may be readily seen, therefore, that the two polyphase relays 17 and 19, provide full protection for the three-phase system 11 irrespective of the nature of the fault.

In Fig. 4, the connections of the secondary windings of the current transformers 13 and 14 to the impedance networks 16 and 18 constitute the only difference between this scheme and that shown and described with reference to Fig. 3. One terminal of each of the respective secondary windings is connected in parallel with a resistance R and inductance Z of both the network 16 and network 18. The other terminals of the secondary windings are connected together and in parallel with the remaining resistances R and inductances Z of the respective networks 16 and 18. The connection and energization of the polyphase relays 17 and 19, is the same as that of the relays shown in Fig. 3.

Fig. 5 is a still different modification utilizing a bridge scheme of connections. Current transformers 12, 13 and 14 are associated with the respective phases A, B and C of a three-phase system 11. Two polyphase relays having their phase windings indicated by $a$, $b$, $c$ and $a'$, $b'$, $c'$, respectively, are connected in bridge circuits 27, 28 and 29 with inductances Z and resistances R. The bridge circuit 27 comprises phases $a$ and $a'$ in parallel arms, and an inductance Z and a resistance R, respectively connected therewith to form the remaining arms of the bridge 27. Similarly, phase windings $b$ and $b'$ are associated with an inductance Z and resistance R to form a bridge 28. Bridge 29 comprises phase windings $c$ and $c'$ and an inductance Z and resistance R.

One terminal of the secondary winding of current transformer 12 is connected to the connection of the inductance Z and phase winding $b$ of the bridge 28. The other terminal of the transformer secondary is connected to the bridge 29 at the connection point of the inductance Z and phase winding $c'$.

One terminal of the secondary winding of current transformer 13 is connected to the bridge 27 at the point of connection of the inducance X and the phase winding $a$. The other terminal of the transformer secondary winding is connected to the bridge 28 at the connection of the inductance Z and phase winding $b'$.

One terminal of the secondary winding of current transformer 14 is connected to the bridge 27 at the connection of the phase winding $a$ and the resistance R. The other terminal of the secondary winding is connected to the phase winding $c'$ and the resistance R of the bridge 29.

The connection of the inductance Z and the phase winding $a'$ of the bridge 27 is connected by means of a conductor to the connection of the inductance Z and the phase winding c of the bridge 29. Another conductor connects between the connections of the phase winding a' and resistance R of the bridge 27, and the phase winding b and resistance R of the bridge 28. Similarly, a connection between the phase winding b' and resistance R of the bridge 28 is made to the phase winding c and resistance R of the bridge 29.

The values of the inductances Z and resistances R are so chosen as to provide for the energization of the polyphase relay, having phase windings a, b and c, in accordance with the negative phase-sequence components of current; and the polyphase relay having phase windings a', b' and c', to be energized in accordance with the positive phase-sequence components of current in the system 11. The two polyphase relays therefore provide full protection for the system 11, irrespective of the phase or phases affected by a fault.

Fig. 5a indicates the manner in which the polyphase relay windings, shown in Fig. 5, may be connected. The respective windings of the relays are wound in a similar manner to the relay windings of a delta-connected relay; however, the terminals of the respective windings are not connected together in a usual manner but are connected in the network as shown in Fig. 5.

In Fig. 6, current transformers 12, 13 and 14 are associated with the phases A, B and C, respectively, of a three-phase system 11 and the secondary windings thereof connected in delta. Phase-sequence segregating networks 31 and 32 are provided for energizing polyphase relays 17 and 19, respectively. The networks 31 and 32 are substantially the same and each comprises a plurality of inductances Z and resistances R connected in series to form a closed delta, each of the sides thereof including alternately one inductance Z and a connected resistance R. The polyphase relays 17 and 19 are shown as having delta-connected phase windings a, b, c, and a', b', c', respectively, and the windings are respectively connected to the connection of the inductances Z and resistances R in each side of the respective networks 31 and 32.

One terminal of the secondary winding of the current transformer 12, is connected in parallel with one terminal connection point of the respective networks 31 and 32.

The corresponding secondary terminal of the current transformer 13 is connected in parallel with a second terminal connection point of the respective networks 31 and 32. The corresponding secondary terminal of the current transformer 14 is connected with a third terminal connection point of the respective networks 31 and 32.

The other secondary terminal of the current transformer 13 is connected in parallel with the terminal of the current transformer 14 and the third terminal connection point of the respective networks 31 and 32. The remaining secondary terminal of the current transformer 12 is connected in parallel with the secondary terminal of the current transformer 13 and the second terminal connection point of the respective networks 31 and 32. The remaining secondary terminal of the current transformer 14 is connected in parallel with the terminal of the current transformer 12 and the first terminal connection point of the respective networks 31 and 32.

The impedance networks 31 and 32 have their values of the inductances Z and resistances R so proportioned that they segregate the negative and positive phase-sequence components of current from the system 11, respectively, and the relays 17 and 19 are accordingly energized thereby in accordance with the respective phase-sequence components of current.

Figure 7:
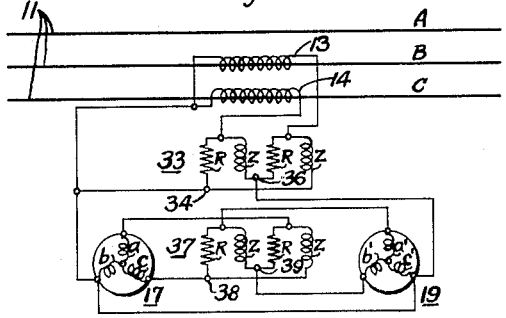
Fig. 7 is a further modification utilizing two current transformers and a different network arrangement.

In Fig. 7, current transformers 13 and 14 are associated with the respective phases B and C of a three-phase system 11. One terminal of the secondary winding of current transformer 13 is connected in parallel with an inductance Z and a resistance R. The corresponding secondary terminal of the current transformer 14 is connected in parallel with another inductance Z and resistance R. The two inductances Z and resistances R are alternately connected in series to form an impedance network 33.

Polyphase relays 17 and 19 are provided and are adapted to be energized in accordance with the negative and positive phase-sequence components of current, respectively. The polyphase relays 17 and 19 are indicated as having their respective phase windings a, b, c and a', b', c', star-connected.

The other secondary terminals of the current transformers 13 and 14 are connected together and in parallel with one terminal point 34 of the network 33 and phase b of relay 17, phase c' of relay 19 and terminal point 36 of the network 33.

The terminal of the phase winding a, of relay 17, is connected in parallel with a resistance R and an inductance Z. The terminal of the phase winding a', of relay 19, is connected in parallel with another resistance R and inductance Z. The two resistances R and inductances Z are alternately connected in series to form an impedance network 37.

The terminals of the phase windings c and b', of the respective polyphase relays 17 and 19, are connected to the terminal points 38 and 39 of the impedance network 37, respectively.

By means of the two impedance networks 33 and 37, the polyphase relays 17 and 19 are energized in accordance with the negative and positive phase-sequence components of current occurring in the system 11, respectively.

Figure 8:
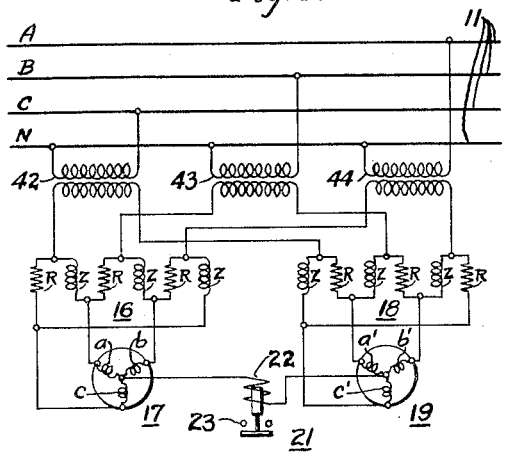
Fig. 8 is a voltage scheme corresponding to Fig. 1.

In Fig. 8, voltage transformers 42, 43 and 44 are associated with the respective phases C, B A and neutral N of a three-phase system 11. The networks 16 and 18, associated with the secondary windings of the said transformers, are similar to the networks shown and described in Fig. 1, and the relays 17, 19 and 21 are associated therewith in a similar manner.

This scheme provides for the energization of the polyphase relays 17 and 19 in accordance with the negative and positive phase-sequence components of voltage, respectively, and the relay 21 in accordance with the zero phase-sequence components of voltage occurring in the three-phase system 11.

Figure 9:
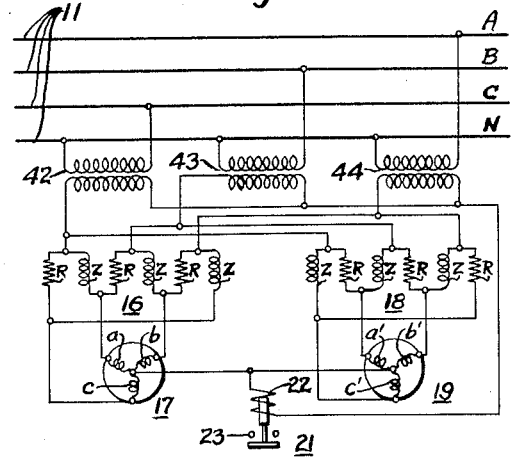
Fig. 9 is a voltage scheme corresponding to Fig. 2.

Fig. 9 is a scheme similar to Fig. 2 with the exception of embodying voltage transformers 42, 43 and 44 associated with the respective phases C, B, A and neutral N of a three-phase system 11. The polyphase relays 17 and 19 are energized in accordance with the negative and positive phase sequence components of voltage, respectively and the relay 21 is energized in accordance with the zero phase-sequence components of voltage occurring in the three-phase system 11.

Figure 10:
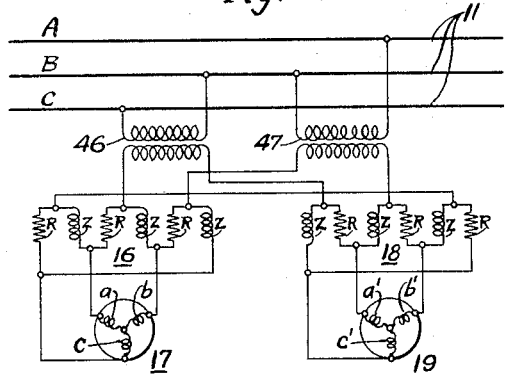
Fig. 10 is a voltage scheme corresponding to Fig. 3.

In Fig. 10, the primary windings of the voltage transformers 46 and 47 are connected across the phases CB and BA, respectively, of a three-phase system 11. The secondary windings of the voltage transformers are connected to networks 16 and 18 and the associated polyphase relays 17 and 19, in a similar manner to the current transformer scheme of Fig. 3. The polyphase relays 17 and 19 are energized in accordance with the negative and positive phase-sequence components of voltage, respectively, segregated from the three-phase system 11.

Figure 11:
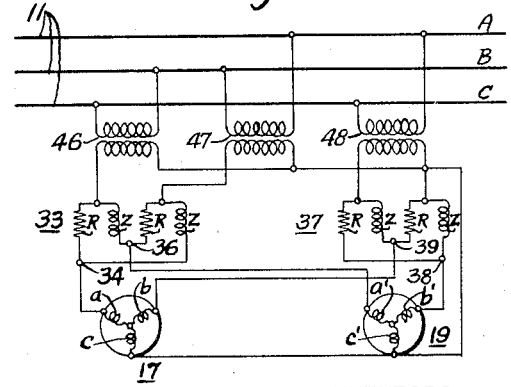
Fig. 11 is a three voltage transformer scheme corresponding to Fig. 7.

Fig. 11 illustrates another voltage transformer scheme, wherein voltage transformers 46, 47 and 48 are connected across the phases CB, BA and CA, respectively, of a three-phase system 11. The secondary windings of the voltage transformers are star-connected, and the terminals thereof associated with phase-sequence segregating networks.

The remaining secondary terminal of the transformer 46 is connected in parallel with a resistance R and an inductance Z. The remaining secondary terminal of the voltage transformer 47 is also connected in parallel with a resistance R and an inductance Z. The resistances R and inductances Z are series-connected to form an impedance network 33.

The remaining secondary terminal of the voltage transformer 48, is connected in parallel with a resistance R and an inductance Z. The star-connection of the secondary windings is also connected in parallel with a resistance R and an inductance Z. The two resistances R and inductances Z are alternately connected in series to form an impedance network 37.

The star-connection of the secondary windings is also connected in parallel with the phases c and c' of the respective star-connected polyphase relays 17 and 19. The phase windings a and a' are connected to the connection points 34 and 36, respectively of the impedance network 33. The phase windings b and b' are similarly connected to the connection points 39 and 38, respectively, of the impedance network 37.

The impedance and proportioning of the networks 33 and 37 is predetermined so that the polyphase relays 17 and 19 are energized in accordance with the negative and positive phase-sequence components of voltage, respectively.

Fig. 12 represents a still further modification of this invention wherein each of a plurality of polyphase relays is energized in accordance with the phase-sequence components of voltage and current in an alternating-current system.

The primary windings of voltage transformers 52, 53 and 54 are connected across the neutral N and phases C, B and A, respectively, of the alternating-current system 11; the secondary windings of the voltage transformers being star-connected.

Polyphase relays 61 and 62, provided with stator windings 63 and 64 and rotor windings 66 and 67, respectively, are associated with the system 11, the stator windings being energized in accordance with the phase-sequence components of voltage in the system 11 and the rotor windings being energized in accordance with the phase-sequence components of current in the system 11. The stator and rotor elements 63, 66 and 64, 67 of the respective relays 61 and 62 are illustrated as being star-connected, although they may be delta-delta, star-delta or delta-star connected.

The stator windings 63 and 64 of the respective relays 61 and 62, are electrically associated with the system 11 through networks 56 and 58 and the secondary windings of the voltage transformers 52, 53 and 54. The networks 56 and 58 and the means of connecting the secondary windings of the voltage transformers and the stator windings of the polyphase relays are substantially the same as the scheme of relay connections depicted in Fig. 9. The network 56 segregates the positive phase-sequence components of voltage from the system 11 and the network 58 segregates the negative phase-sequence components of voltage from the system 11. The phase windings a, b, c and a', b', c' of the stator windings 63 and 64 are, therefore, energized in accordance with the positive and negative phase-sequence components of voltage, respectively.

The rotor windings 66 and 67 of the respective polyphase relays 61 and 62 have their respective phase windings S, T, U and S', T', U' energized in accordance with the positive and negative phase-sequence components of current, respectively, occurring in the system 11. Current transformers 72, 73 and 74 are associated with the phases A, B and C of the system 11, respectively, the secondary windings of said transformers being star-connected. Networks 76 and 78, each comprising a plurality of resistances R and inductances Z, are electrically associated with the secondary windings of the current transformers and the respective phase windings S, T, U and S', T', U' of the polyphase rotor windings 66 and 67. The current transformers 72, 73, 74, networks 76, 78 and rotor windings 66, 67 are electrically connected substantially the same as the scheme of relay connections shown and described with reference to Fig. 2.

Instead of utilizing a single-phase zero phase-sequence relay serially connected with the star connection of the voltage and current transformers and the star points of the stators 63, 64 and the rotors 66, 67, respectively, a current actuated voltage restrained relay 60 is provided. The voltage winding 57 is serially connected, with the star-connection of the secondary windings of voltage transformers 52, 53, 54 and the electrical connection between the star points of the stators 63 and 64. Thus, the winding 57 is energized in accordance with the zero phase-sequence components of voltage occurring in the system 11.

The current winding 59, of the zero phase-sequence relay 60, is serially connected with the star connection of current transformers 72, 73, 74 and the serially-connected star points of the rotors 66, 67. The winding 59 is, therefore, energized in accordance with the zero phase-sequence components of current occurring in the system 11. The zero-phase-sequence relay 60 acts as an impedance relay and will therefore provide a time element of operation dependent upon the distance of a fault from the relay.

It is obvious that the electrical connections of the stators 63, 64 and the rotors 66, 67 may be changed to correspond to any of the modifications illustrated in the drawings, and the zero phase-sequence relay 60 may or may not be utilized, as desired. A single phase-sequence relay may be provided responsive to the zero phase-sequence components of voltage or a similar relay responsive to the zero phase-sequence components of current instead of the combination thereof shown in Fig. 12. The zero phase-sequence relay 60 may also be a simple watt-relay or reactive watt-relay, thereby providing a directional relay responsive to the zero phase-sequence components of voltage and current.

The polyphase relays 61 and 62 may be either of the watt-relay or directional type or of the impedance type, depending upon the type of system to be protected. The stators of the two relays may also be energized in accordance with the phase-sequence components of current and the rotors energized in accordance with the phase-sequence components of voltage occurring in the system. It is clearly apparent that the relay 61, being responsive to the positive phase-sequence components of voltage and current, will be energized to effect the actuation thereof either with respect to the direction of the flow of the phase-sequence components of voltage or with respect to the location of the fault, depending upon whether the relay 61 is a simple directional watt-relay or an impedance relay. Similarly, the relay 62 will respond to the negative phase-sequence components of voltage and current occurring in the system.

From the foregoing description, it is apparent that the relay 61 will be energized for all fault conditions occurring on the system 11, the magnitude of such energization depending upon the nature and characteristics of such fault. The relay 62 will be energized as a result of all fault conditions other than balanced three-phase faults while the zero phase-sequence relay 60 will be energized only as a result of a single or double fault to ground.

Again referring to the modification shown in Fig. 12, it is obvious that the networks 56 and 58 may be interchanged, thereby providing for the energization of the stators 63 and 64 by the negative and positive phase-sequence components of voltage, respectively. While the rotors 66 and 67 remain energized in accordance with the positive and negative phase-sequence components of current, respectively.

Another modification comprises the use of the network 56 as a positive phase-sequence network and the network 58 as a negative phase-sequence network for effecting the energization of the relay stator windings 63 and 64 in accordance with the positive and negative phase-sequence components of voltage, respectively. With this energization of the stator windings, the rotor windings 66 and 67 may be energized in accordance with the negative and positive phase-sequence components of current, providing that the networks 76 and 78 segregate the positive and negative phase-sequence components of current, respectively, from the system 11.

Since the two polyphase relays 61 and 62 are similar, it will be seen that any one polyphase relay, having stator and rotor windings, may have the stator winding thereof energized in accordance with the positive or negative phase-sequence components of voltage or current and the rotor winding energized in accordance with the positive or negative phase-sequence components of voltage or current.

In order to provide a polyphase relay wherein the stator winding is energized in accordance with the positive or negative phase-sequence components of current and the rotor winding is energized in accordance with the positive or negative phase-sequence components of voltage, it is only necessary to consider the windings 63 and 64 of the relays 61 and 62 as the relay rotor windings, and the respective windings 66 and 67 as the relay stator windings.

Fig. 13 is a still further modification of the present invention utilizing a polyphase relay 61 having stator and rotor windings 63 and 66, respectively. Current transformers 12, 13 and 14 are associated with the respective phases A, B and C of a polyphase system 11, and the terminals of their respective windings are connected to phase-sequence segregating networks 16 and 18 similarly to the connections shown in Fig. 1.

The stator winding 63, having phases $a$, $b$, $c$, is electrically connected to the network 16 in a similar manner to the connections of the polyphase relay 17 in Fig. 1, and is, therefore, energized in accordance with the negative phase-sequence components of current. The rotor winding 66, having phase windings S, T, U, is electrically connected to the network 18 in a similar manner to the connections of the polyphase relay 19 in Fig. 1. The rotor winding 66 is, therefore, energized in accordance with the positive phase-sequence components of current.

The networks 16 and 18 may be adapted to segregate the positive and negative phase-sequence components of current from the system 11, respectively, or the windings 63 and 66 may be considered as being the rotor and stator windings, respectively, of the polyphase relay 61.

No zero phase-sequence relay has been shown with reference to this modification of the present invention, since the one polyphase relay 61 is effectively energized on the occurrence of any fault conditions occurring on the system 11. However, it is obvious that a zero phase-sequence relay may be serially connected with the star-connection points of the windings 63 and 66, which connection points are connected by conductor 65.

It is believed unnecessary to illustrate all of the various current and voltage modifications of the present invention as being applicable to a single polyphase relay having stator and rotor windings, as is depicted in Fig. 13, in view of the obvious nature of such modifications. It should also be borne in mind that all of the relays of the various modifications may have their respective windings connected in delta or star arrangement and, in the relays having stator and rotor windings, any combination of connections may be utilized, as desired.

It should be realized that the polyphase positive, negative and zero phase-sequence elements may be combined in every desired combination. For example, any component of voltage may be combined with the same or other component of voltage; any component of current may be combined with the same or other component of current; any component of voltage may be combined with the same or other component of current. In the relay itself, the relative phase may be such as to give watt or reactive watt relays, or combined at other angles. As referred to hereinbefore, the relay may measure the ratio of voltage and current as in an impedance relay. The individual relays may also be combined to give the sum or difference or the ratio of different quantities.

It may also be desired and advantageous to provide an adjustable response for the polyphase relays, and this may be effected by altering the transformation ratio of the transformers or by changing the relay windings themselves. By providing an adjustable response for the relays, the relays may be provided with an adjustable response to unbalanced system conditions without affecting their response to balanced conditions.

It is to be understood that other phase-sequence segregating networks may be used, the networks shown in the different modifications of this invention being merely illustrative. For example, capacity reactances may be substituted for the inductive reactances in the impedance elements or networks. Assuming that such a substitution has been effected, the only variance from the condition with inductive reactances will be to interchange the positive and negative phase-sequence relay responses.

It is obvious that for cases in which no zero phase-sequence components of voltage or current are obtained, that the phase-sequence segregating network may be simplified considerably. For certain applications, even with the zero phase-sequence components present, it is permissible to ignore their effects and thus permit the use of a more simple type of network such as could be used if no zero phase-sequence components were present.

All of the modifications shown in the drawings will provide full and effective protection in the event of any system faults, regardless of the system or fault characteristics. The polyphase relays may be used to protect transmission or network systems and electrical apparatus of any kind from faulty or other abnormal conditions.

In the various figures of the drawings, a single polyphase relay may be employed and a network similar to the one described in the copending application of R. D. Evans, U. S. Serial No. 436,404, filed March 17, 1930, may be utilized. By utilizing such a network, a single polyphase relay would be energized in accordance with both the positive and negative phase-sequence components of voltage or current occurring in a polyphase system.

The different modifications have also been described with reference to polyphase relays, but it is obvious that this invention is equally applicable for metering or regulating purposes.

It is desired, therefore, that no limitations be placed upon the spirit and scope of the present invention other than are necessitated by the prior art and indicated in the appended claims.

We claim as our invention:

1. The combination with an alternating-current system, of transforming means associated therewith, polyphase electro-responsive means effectively energized upon the occurrence of abnormal system conditions, electro-responsive means associated therewith responsive to ground conditions occurring on said system and means interposed between said transforming means and said polyphase electro-responsive means for effecting the energization thereof in accordance with the phase-sequence components of an electrical quantity occurring in said system.

2. The combination with an alternating-current system, of current transforming means associated therewith, a positive phase-sequence polyphase electro-responsive means, a negative phase-sequence polyphase electro-responsive means, a zero phase-sequence electro-responsive means electrically associated with both of said polyphase electro-responsive means, and phase-sequence segregating means electrically interposed between said transforming means and said polyphase electro-responsive means.

3. The combination with an alternating-current system, of voltage transforming means associated therewith, a positive phase-sequence polyphase electro-responsive means, a negative phase-sequence polyphase electro-responsive means, a zero phase-sequence electro-responsive means electrically associated with both of said polyphase electro-responsive means and phase-sequence segregating means electrically interposed between said transforming means and said polyphase electro-responsive means.

4. In combination with a polyphase alternating current circuit, phase sequence network means for segregating a symmetrical system of current components of the polyphase current of said circuit, phase sequence network means for segregating a symmetrical system of voltage components of the polyphase voltage of said circuit, and a polyphase electroresponsive device having a set of current windings each energized independently in accordance with one of said current components and a set of voltage windings each energized independently in accordance with one of said voltage components.

5. In combination with a polyphase alternating current circuit, phase sequence network means for segregating a first symmetrical system of components of a polyphase electrical condition of said circuit, phase sequence network means for segregating a second symmetrical system of components of a polyphase electrical condition of said circuit, and a polyphase electroresponsive device having a set of stator windings each independently responsive to a component of said first system and a set of rotor windings each independently responsive to a component of said second system, whereby maximum torque of said device is obtained for a given resistance loss therein.

6. In combination with a polyphase alternating current circuit, a set of current transformers in said circuit, each of said current transformers having a pair of secondary terminals, phase sequence network means connected to one terminal of each of said transformers for segregating a system of positive symmetrical components of the polyphase current of said circuit, phase sequence network means connected to the remaining terminals of said transformers for segregating a system of negative symmetrical components of the polyphase current of said circuit, and translating means responsive to said positive and negative components.

7. In combination with a polyphase alternating current circuit, a set of current transformers in said circuit, each of said current transformers having a pair of secondary terminals, phase sequence network means connected to one terminal of each of said transformers for segregating a system of positive symmetrical components of the polyphase current of said circuit, phase sequence network means connected to the remaining terminals of said transformers for segregating a system of negative symmetrical components of the polyphase current of said circuit, a first polyphase translating device connected to said first mentioned network means, said device having a neutral connection, a second polyphase translating device connected to said second mentioned phase sequence means, said second device having a neutral connection, and a device responsive to zero phase sequence current of said circuit connected to said neutral connections.

CHARLES Le G. FORTESCUE.
ROBERT D. EVANS.